United States Patent

[11] 3,626,815

[72] Inventors Max Fingeroot
Oak Park;
Robert G. Minty, Warren, both of Mich.
[21] Appl. No. 48,696
[22] Filed May 25, 1970
[45] Patented Dec. 14, 1971
[73] Assignee American Motors Corporation
Kenosha, Wis.
Continuation of application Ser. No.
797,986, Feb. 10, 1969, now abandoned.
This application May 25, 1970, Ser. No.
48,696

[54] PISTON
7 Claims, 7 Drawing Figs.
[52] U.S. Cl............................................. 92/210,
74/579, 74/589, 92/238, 123/192 B, 123/193 P
[51] Int. Cl......................................... F16j 1/04,
F16h 21/40, F02b 75/06
[50] Field of Search......................................... 92/210,
238, 208; 123/192, 192 B, 193, 193 P; 74/579, 589

[56] References Cited
UNITED STATES PATENTS
2,974,541  3/1961  Dolza........................... 74/579

Primary Examiner—Martin P. Schwadron
Assistant Examiner—Irwin C. Cohen
Attorney—Barbee & Latta ABSTRACT: A piston constructed with a greater amount of its total weight located on one side of the longitudinal axis for the piston pin bore than on the other side. Where an offset piston pin mounting arrangement is utilized, the greater amount of the total weight of the piston is located on the same side of the longitudinal axis of the piston as the offset. The greater weight being provided, preferably, by making the thrust skirt of the piston of a greater wall thickness than the antithrust skirt. In another embodiment, the greater weight being provided by making the thrust wall of the piston pin bore of a greater thickness than the antithrust wall.

Patented Dec. 14, 1971
3,626,815
2 Sheets-Sheet 1
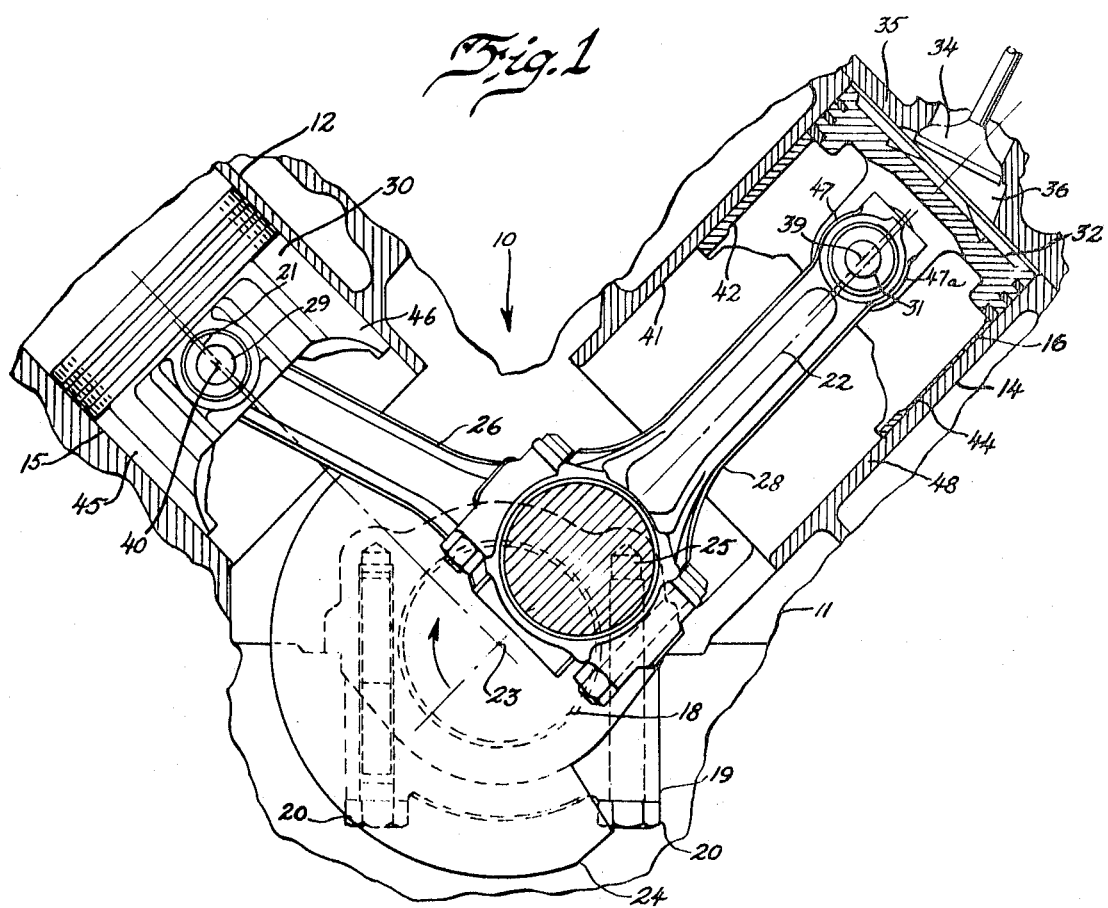
Fig. 1
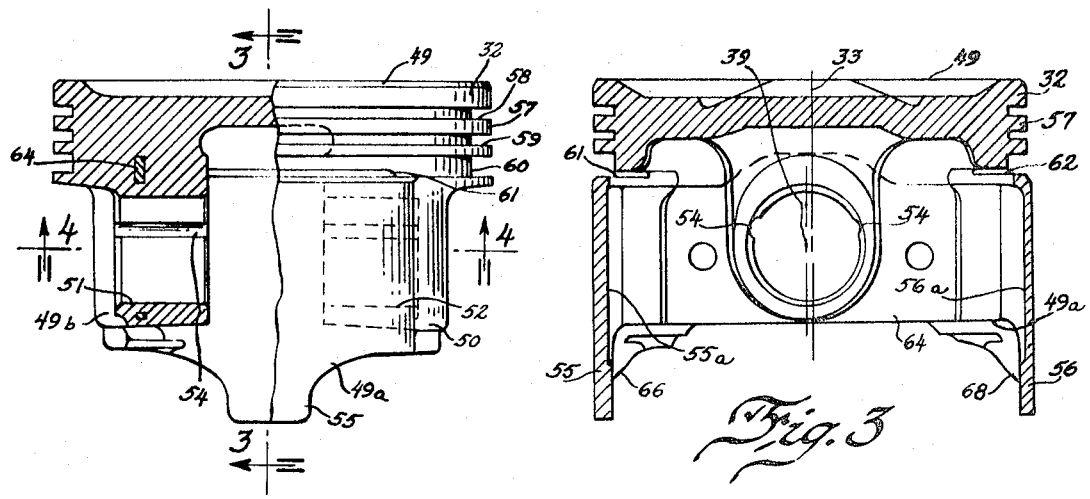
Fig. 2
Fig. 3
Inventors,
MAX FINGEROOT
ROBERT G. MINTY
By Barbee & Latta
Attorneys Patented Dec. 14, 1971
3,626,815
2 Sheets-Sheet 2
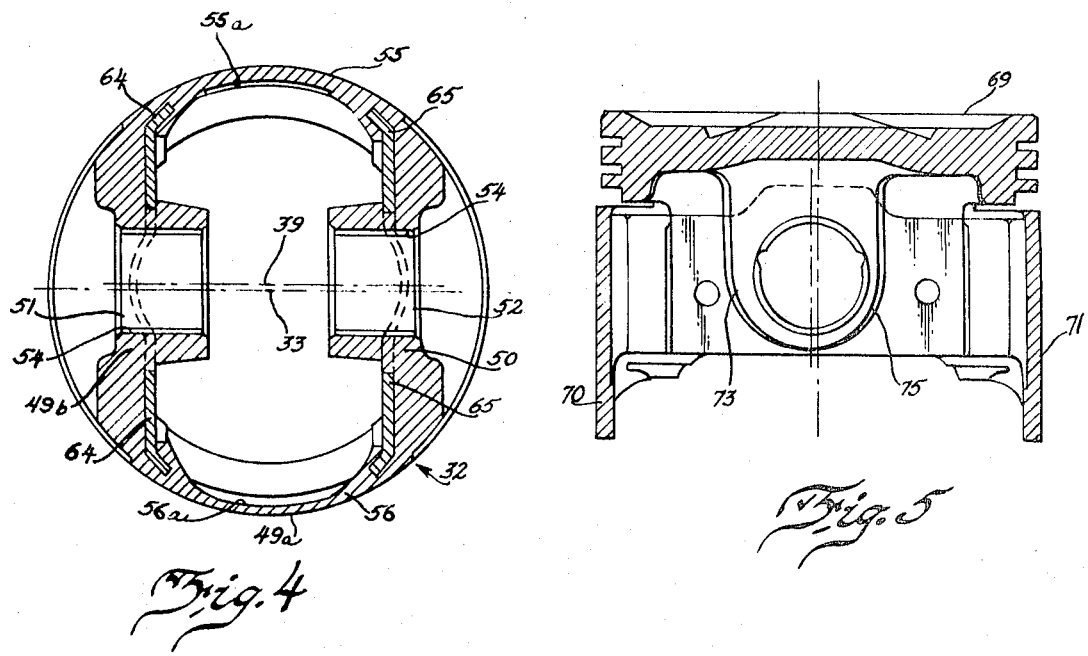
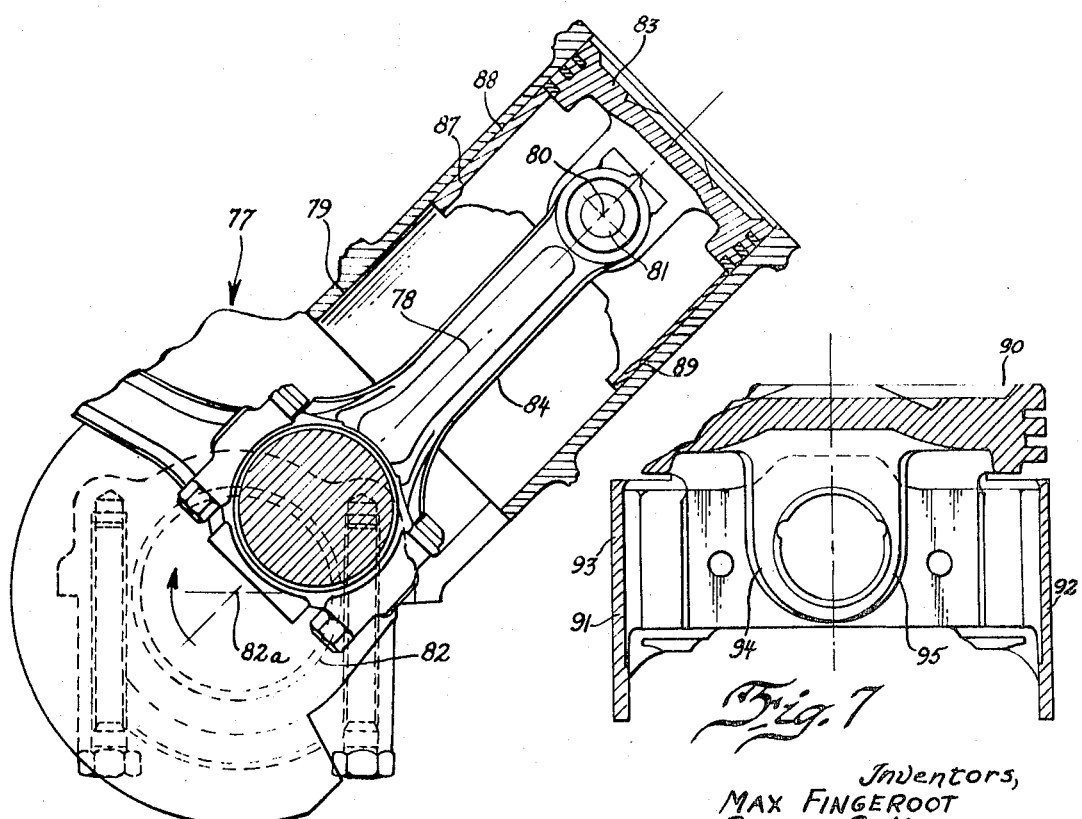
Inventors,
MAX FINGEROOT
ROBERT G. MINTY
By
Barbee & Latta
Attorneys

PISTON

BACKGROUND OF THE INVENTION

1. Field of the Invention

This invention pertains primarily to pistons for internal combustion engines.

2. Description of the Prior Art

The conventional piston for an internal combustion engine has a head portion with a piston ring belt area having grooves for two comparison rings and a lower oil control ring. A steel insert is commonly embedded in the aluminum alloy piston below the oil control ring to control thermal expansion and also for added strength. Depending from the head portion of the piston are the aligned piston pin bosses located on opposing sides of the piston. Suitable external ribs extending from the inner part of the head portion of the piston reinforce the bosses. A piston skirt also depends from the head portion of the piston and is integral therewith and also with the bosses. The skirt extends around the piston to its greatest length which is normal to the piston pin bore axis. This piston, due to its configuration, is commonly called a slipper-type piston. While the head portion of the piston is normally cylindrical, the skirt is cam ground and has its greatest diameter normal to the piston pin bore axis. The piston skirt contacts the cylinder wall thus forming the effective bearing area.

Although pistons for racing engines may have the axis of the piston pin bore intersect the longitudinal axis of the piston, it is more common for the piston pin bore axis to be "offset" from the longitudinal axis of the piston by varying amounts of which one-sixteenth inch may be an average figure. It is felt that the offset reduces "piston slap" and the resulting noise due to the translational and rotational movement of the piston.

With or without offset, the piston skirt on the "thrust" side of the piston is subjected to severe stress during the power stroke of the piston and frequent cracking of the skirt results. The problem is accentuated on pistons for high-speed engines.

Summary OF THE INVENTION

Applicants have made calculations to determine piston side forces throughout the entire cycle of operation at various speeds. Various offsets were also considered. The greatest side force exerted on the piston by the stationary cylinder wall was found to occur shortly after the beginning of the power stroke when the reaction force of the rod after top dead center forces the thrust side of the piston laterally against the cylinder wall. During this period, however, the cylinder wall reaction force is disturbed along the full length of the piston skirt resulting in relatively low piston stresses. As the piston approaches its bottom dead center position on the power stroke, the combined moments about the piston pin axis due to (1) combustion gas pressure on the top of the piston and the piston pin offset, (2) acceleration of the piston in a direction opposite to that of the crankshaft together with the mass of the piston, (3) friction of the piston pin, (4) friction between piston and cylinder wall, and (5) the force of the connecting rod acting through the piston pin as it goes through its motion, together produce a rotation of the piston within the cylinder bore clearance such that the reaction loads of the cylinder bore on the piston are localized at the top and bottom of the piston skirt on the antithrust and thrust sides respectively. Inasmuch as a portion of the lower part of the piston skirt may extend below the cylinder wall, which is customarily reduced in length to provide clearance for the crankshaft counterweights, the effective bearing area of the skirt is reduced, thereby increasing the stress thereon.

To strengthen the piston thrust skirt, while at the same time opposing the above-noted moment, applicants made the thrust skirt of a greater wall thickness than the antithrust skirt, minimizing the overall weight of the piston while providing skirt strengths and stiffnesses proportional to the cylinder wall reaction loads. Further, the greater wall thickness creates a counter inertial moment which reduces the combined moments and lowers the forces exerted on the piston skirts when the piston is rotated in the cylinder bore. Reducing the skirt forces also reduces the friction between the piston and the cylinder. With or without offset, the forces are reduced. Increasing the thickness of the thrust wall of the piston pin bore produces the same effect. Similar results are also obtained on the intake stroke.

On the exhaust stroke, the moment of the greater skirt or bore wall thickness also helps to reduce the moment of the force of the inertia of the piston about the piston pin axis.

During the latter part of the compression stroke, the force of the combustion chamber gas on the top of the piston is substantial. In this case, the inertial moment of the greater skirt or bore wall thickness reinforces the moment of the force of the combustion chamber gas. However, the side forces on the piston skirt are relatively low and are distributed over the entire effective bearing area of the antithrust skirt.

As a consequence of the above construction, the thrust skirt or the thrust wall of the piston pin bore is strengthened and more importantly the side forces exerted on the piston skirts are reduced.

BRIEF DESCRIPTION OF THE DRAWINGS

FIG. 1 is a front view (partially in section) and with portions thereof cut away of a V-type engine utilizing the preferred embodiment of the novel piston of this invention;

FIG. 2 is an enlarged left side view, partly is section, of the piston shown in either cylinder bank of FIG. 1;

FIG. 3 is a sectional view taken along line 3—3 of FIG. 2 and corresponding to the sectional view of the piston shown in the right cylinder bank of FIG. 1;

FIG. 4 is a sectional view taken along line 4—4 of FIG. 2;

FIG. 5 is a sectional view, similar to FIG. 3, of another embodiment of the novel piston of this invention and suitable for use in the engine of FIG. 1;

FIG. 6 is a front view, partially in section, and with portions thereof cut away, of an engine utilizing another embodiment of the novel piston of this invention; and FIG. 7 is an enlarged sectional view of another embodiment of the novel piston of this invention suitable for use in the engine of FIG. 6.

DESCRIPTION OF THE PREFERRED EMBODIMENTS

Referring to FIG. 1, 10 is a V-type engine having a block 11 with a pair of angularly disposed banks 12 and 14 of cylinders of which only 15 and 16 are shown. Crankshaft 18 is rotatably mounted on block 11 by conventional bearings and bearing caps such as cap 19 and bolts 20. The axis 21 of cylinder 15 and axis 22 of cylinder 16 intersect the axis of rotation 23 of crankshaft 18. Crankshaft 18 has conventional counterweights such as 24 shown and a plurality of radial throws of which throw 25 is shown. Rotatably mounted on throw 25 via suitable bearings, caps and bolts are connecting rods 26 and 28. Rod 26 is secured to piston pin 29 which is journaled in piston 30. Rod 28 is similarly connected to piston pin 31 of piston 32. Piston 32 is shown in the top dead center position in cylinder 16. Valve 34 mounted in head 35 forms a part of conventional combustion chamber 36. Piston 30 is shown in the position it assumes corresponding to the location of piston 32. Valve 34 is actuated by a conventional camshaft, push rod and rocker arm arrangement (not shown).

Looking at engine 10 from the front, as shown in FIG. 1, the rotation of the crankshaft 18 is clockwise as noted by the arrow. Also to be noted is that the longitudinal axis 39 of piston pin 31 (and the bore therefor) is offset from the longitudinal axis 33 of piston 32 which is shown as lying on the axis 22 of cylinder 16. The direction of the offset is toward the centerline of engine 10 on which is generally located the intake manifold (not shown). Longitudinal axis 40 of pin 29 (and the bore therefor) is similarly offset from the longitudinal axis of piston 30. The direction of offset axis 40 is in the same direction as that of axis 39—in this case being toward the exhaust manifold (not shown) of cylinder 15.

Upon movement of piston 32 downward on the power stroke from the top dead center position to drive crankshaft 18 in the direction shown, it is readily apparent that connecting rod 28 will assume various crank angles. Inasmuch as the crankshaft 18 will offer a reaction to the axial force exerted by the rod 28, causing the rod via the piston pin to exert a force on the piston having generally upward and sideward components, the piston 32 because of its clearance in cylinder 16 (0.001 to 0.002 inch) will be driven against portion 41 of cylinder 16 which is adjacent the intake manifold area. Thus, side 42 of piston 32 is the "thrust side" of the piston and side 44 is the "antithrust side." Similarly, side 45 is the "thrust side" of piston 30 and side 46 is the "antithrust side." Generally, the forces acting on the antithrust side of the piston are relatively low. Following similar reasoning, piston pin 39 exerts a force on the pin bore wall 47 making same the "thrust side" and 47a and "antithrust side." Piston pin 29 of piston 30 produces a similar effect.

On the compression stroke of piston 32, connecting rod 28 due to the changes in crank angle, produces a force on piston 32 having generally opposite components to that previously mentioned that tend to force antithrust side 44 of piston 32 against portion 48 of cylinder 16. Piston 30 is affected similarly as are the piston pin bore walls.

It is to be noted that a piston for an in line type engine for the same rotation of the crankshaft and a piston pin offset toward the thrust side would encounter the same load conditions as detailed above for a V-type engine.

Applicants, due to the frequent cracking of the lower portion of the piston on the thrust side and the high frictional losses have designed a piston to alleviate these conditions. In the preferred embodiment as best shown in FIGS. 1, 2, 3, and 4, applicants have strengthened the critical area by increasing the wall thickness on the thrust side of the piston from that of the antithrust side. More importantly, the inertial moment of the greater wall about the offset piston pin axis creates a counter moment to reduce the sum of all the other moments thereabout primarily on the power stroke of the piston and thus reduce the forces on the piston. In the ideal condition, the moments could be balanced at a desired engine speed.

Applicants' novel piston 32 is shown in detail in FIGS. 1, 2, 3, and 4. It is to be noted that piston 32 and piston 30 are identical and thus only piston 32 will be described. Both pistons were shown to emphasize the need to position each properly in engine 10.

Piston 32 has a head portion 49 and a partially elliptical skirt portion 49a depending therefrom and extending around the perimeter of the piston. Integral with skirt portion 49a are aligned piston pin bosses 49b and 50 located on opposite sides of piston 32. Boss 49b has piston pin bore 51 therein and boss 50 has bore 52. Axis 39, which is the common axis for the aligned bores, does not intersect longitudinal axis 33 of piston 32 but is offset therefrom. Both bores have suitable grooves 54 for lubrication of the piston pin. Skirt portion 49a has parts 55 and 56 which extend to their greatest length from head portion 49 on opposite sides of bore axis 39. The skirt portion adjacent the bosses being much shorter than parts 55 and 56. When piston 32 is mounted in engine 10, as shown in FIG. 1, part 55 of skirt portion 49a is the thrust skirt and part 56 is the antithrust skirt of piston 32.

The head portion of piston 32 has also a circular ring belt area 57. Located therein are upper grooves 58 and 59 for compression rings and lower groove 60 (having suitable openings 61 and 62 into the interior of the piston) for an oil control ring. Embedded in piston 32 and extending around pin bore 51 is steel insert 64. Insert 65 is similarly located in regard to bore 52. Both inserts are provided to supply additional strength to piston 32 and control thermal expansion.

As best shown in FIGS. 1, 3, and 4, applicants have deviated from the conventional piston by creating a greater wall thickness for thrust part 55 of skirt portion 49a than part 56. Applicants preferably have decreased the radius to the inner surface 55a of part 55 from 56a of part 56. The changed wall thickness, it is noted, extends from the lowest part of groove 60 the length of parts 55 and 56. Radii to the shoulders 66 and 68, necessary for casting purposes, follow the same construction. The resulting wall thickness differential is substantial and beyond manufacturing tolerances. Due to the volume involved and lengthy moment arms, a substantial reduction in total moments is possible.

Referring to the piston embodiment disclosed in FIG. 5 and adapted to be used in the engine of FIG. 1, piston 69 is identical to piston 32 (and has piston pin bore offset) but thrust skirt part 70 and antithrust skirt part 71 have equal wall thicknesses. Thrust piston pin bore wall 73, however, is thicker than antithrust bore wall 75. The bore wall of the piston pin boss (not shown) has a similar construction. Due to the shorter moment arm, as compared with the piston of FIG. 1, the piston construction of FIG. 1 is preferred.

Referring to FIG. 6, the engine 77 disclosed therein is similar to engine 10 of FIG. 1 but the axis 78 of cylinder 79 intersects the longitudinal axis 80 of piston pin 81 and consequently the bore therefor. Axis 78 of cylinder 79 also intersects the axis 82a of rotation of crankshaft 82. Piston 83 is disposed in cylinder 79 with the longitudinal axis therefore lying on axis 78. Connecting rod 84 connects piston 83 to crankshaft 82 via piston pin 81. From the above, engine 77 does not utilize an offset piston pin mounting arrangement. However for the rotation of the crankshaft 82 shown, the forces on piston 83 are similar to those on the piston shown in FIG. 1. Applicants, therefore, have made the thrust part 87 of the skirt portion 88 of a greater wall thickness than the antithrust part 89. The balance of piston 83 (other than the offset) is similar to that shown in FIGS. 2, 3 and 4.

In the embodiment of FIG. 7, piston 90 is similar in construction to the piston of FIG. 6 except that the thrust part 91 of the skirt portion 93 has a wall thickness identical to the antithrust part 92. However, thrust bore wall thickness 94 is greater than the antithrust bore wall thickness 95, which is similar to the construction shown in FIG. 5.

Having thus described the invention it will be apparent to those skilled in the art that various modifications and changes can be made without departing from the spirit of the invention or the scope of the appended claims.

We claim:

1. A piston for an internal combustion engine of the type comprising: a head portion having a piston ring belt area, at least one piston pin boss depending from said head portion and extending below said belt area, said one boss having a bore therein for a piston pin, the longitudinal axis of said bore being offset from the longitudinal axis of said head portion, and a piston skirt depending from said head portion, wherein the improvement comprises: said piston having a greater amount of its total weight located on the same side of the longitudinal axis of said head portion as said bore axis and beyond said bore axis than on the other side, to provide an inertial moment about said bore axis to substantially reduce the sum of all of the other moments thereabout primarily during the power stroke of said piston.

2. The piston of claim 1 further comprising a second piston pin boss depending from said head portion, and having a bore therein, the longitudinal axis of the bore of said second piston pin boss and said one piston boss being aligned.

3. The piston of claim 2 in which said greater amount of said total weight of said piston is provided by making said piston skirt of a greater wall thickness on the same side of the longitudinal axis of said head portion as said bore axis than on the other side.

4. The piston of claim 3 in which said skirt has an annular configuration and extends to its greatest length from said head portion on opposing sides of said bore axis.

5. The piston of claim 4 in which the greater wall thickness of said skirt is provided by making the inner surface of said wall an arc of a circle having its center on the longitudinal axis of the head portion of said piston.

6. The piston of claim 1 in which said greater amount of said total weight of said piston is provided by making said bore of said one boss of a greater wall thickness on the same side of said longitudinal axis of said head portion as said bore axis than on the other side.

7. The piston of claim 2 in which said greater amount of said total weight of said piston is provided by making said one bored boss and said second bored boss of a greater wall thickness on the same side of said longitudinal axis of said head portion as said bore axis than on the other side.

* * * * *